(12) United States Patent
Cole et al.

(10) Patent No.: US 9,250,135 B2
(45) Date of Patent: Feb. 2, 2016

(54) MWIR SENSOR FOR FLAME DETECTION

(75) Inventors: Barrett E. Cole, Bloomington, MN (US); James Allen Cox, New Brighton, MN (US); Kwong Au, Bloomington, MN (US); Christopher Larsen, Rockford, MN (US)

(73) Assignee: Honeywell International Inc., Morristown, NJ (US)

( * ) Notice: Subject to any disclaimer, the term of this patent is extended or adjusted under 35 U.S.C. 154(b) by 671 days.

(21) Appl. No.: 13/419,410

(22) Filed: Mar. 13, 2012

(65) Prior Publication Data

US 2012/0235042 A1    Sep. 20, 2012

Related U.S. Application Data

(60) Provisional application No. 61/453,471, filed on Mar. 16, 2011.

(51) Int. Cl.
| | |
|---|---|
| *G01J 5/04* | (2006.01) |
| *G01J 5/00* | (2006.01) |
| *G01J 5/02* | (2006.01) |
| *G01J 5/08* | (2006.01) |
| *G01J 5/20* | (2006.01) |

(52) U.S. Cl.
CPC ............. *G01J 5/046* (2013.01); *G01J 5/0014* (2013.01); *G01J 5/0018* (2013.01); *G01J 5/026* (2013.01); *G01J 5/0806* (2013.01); *G01J 5/0812* (2013.01); *G01J 5/0862* (2013.01); *G01J 5/0875* (2013.01); *G01J 5/20* (2013.01); *G01J 2005/0077* (2013.01)

(58) Field of Classification Search
CPC ....... G01J 5/0014; G01J 5/08; G01N 21/3504
USPC .............................. 250/338.1, 339.14, 339.15
See application file for complete search history.

(56) References Cited

U.S. PATENT DOCUMENTS

| | | | | |
|---|---|---|---|---|
| 4,459,484 | A | * | 7/1984 | Tar .............................. 250/338.3 |
| 5,286,976 | A | | 2/1994 | Cole |
| 5,548,329 | A | | 8/1996 | Klatt |
| 5,550,373 | A | * | 8/1996 | Cole et al. .................. 250/338.1 |
| 6,046,485 | A | | 4/2000 | Cole et al. |
| RE36,706 | E | | 5/2000 | Cole |

(Continued)

FOREIGN PATENT DOCUMENTS

| | | |
|---|---|---|
| EP | 2037425 | 10/2008 |
| JP | 7286895 | 10/1995 |
| WO | 2007109875 A1 | 10/2007 |

OTHER PUBLICATIONS

"High Performance UV Digital Camera C8484-16C," Hamamatsu Photonics K.K., Cat. No. SCAS0051E01, 2 pages. 2008.

(Continued)

*Primary Examiner* — Casey Bryant
(74) *Attorney, Agent, or Firm* — Seager, Tufte & Wickhem LLP

(57) ABSTRACT

A system for detecting a flame. The system may discriminate between a detected hot object and flame. The system may be a camera-like structure incorporating an infrared sensor, a lens, and an element that could filter out some of the long-wave infrared radiation. The sensor may receive radiation of a scene which forms images on the sensor. The images may be provided to a processor that incorporates one or more modules to determine whether a flame is present in the scene.

21 Claims, 17 Drawing Sheets

(56) References Cited

U.S. PATENT DOCUMENTS

| | | | |
|---|---|---|---|
| 6,097,031 | A | 8/2000 | Cole |
| 6,322,670 | B2 | 11/2001 | Cole et al. |
| 6,495,070 | B1 | 12/2002 | Cole et al. |
| 6,627,892 | B2 | 9/2003 | Cole |
| 6,627,907 | B1 | 9/2003 | Cole |
| 6,653,939 | B2 | 11/2003 | Galloway |
| 6,838,306 | B2 | 1/2005 | Cole |
| 6,919,730 | B2 | 7/2005 | Cole et al. |
| 7,048,384 | B2 | 5/2006 | Cole et al. |
| 7,057,402 | B2 | 6/2006 | Cole et al. |
| 7,145,143 | B2 | 12/2006 | Wood et al. |
| 7,710,280 | B2 | 5/2010 | McLellan |
| 7,746,236 | B2 | 6/2010 | Cole |
| 8,294,008 | B2 | 10/2012 | Cole et al. |
| 2002/0001333 | A1 | 1/2002 | Glasheen et al. |
| 2003/0065409 | A1* | 4/2003 | Raeth et al. ............... 700/31 |
| 2009/0014657 | A1* | 1/2009 | Cole ............... 250/353 |
| 2013/0009062 | A1* | 1/2013 | Cole ............... 250/342 |

OTHER PUBLICATIONS

"Inframetrics/FLIR ThermaCam PM 290, FLIR PM 390, PM 250, PM350," American Infrared, 2 pages, Printed Nov. 28, 2012.

"List of Cameras." Compiled before Nov. 28, 2012.

"Tau 320™ Low Cost, High Volume, IR Camera Core," FLIR, 8 pages, 2011.CC 0211 0015 EN.

"XCEU50 ½" Near UV Sensitive B/W Camera, Sony Electronics Inc., 4 pages, Printed Nov. 28, 2012.

Guoying Zhao and Matti Pietikainen, "Dynamic Texture Recognition Using Local Binary Patterns with an Application to Facial Expressions," IEEE Transactions on Pattern Analysis and Machine Intelligence, 14 pages. 2007.

Indigo™ Brighter, "Alpha NIR™ World's First all-digital Near-IR camera," Indigo Systems Corp, 6 pages, Revision A 1/04, 2004. Product Discontinued.

MicroIR® Technology, "PMC300™ Infrared Camer for Long Range Surveillance," BAE Systems North America, 2 pages, Sep. 2004. PUBS-04-D53.

OPTRA, "Fabry-Perot Scanning Spectrometer," OPTRA, 2 pages, Printed Nov. 2012.

International Search Report for Corresponding Application No. PCT/US2012/29084 Dated Mar. 14, 2012.

International Search Report for Corresponding Application No. EP12757950 dated Aug. 6, 2014.

* cited by examiner

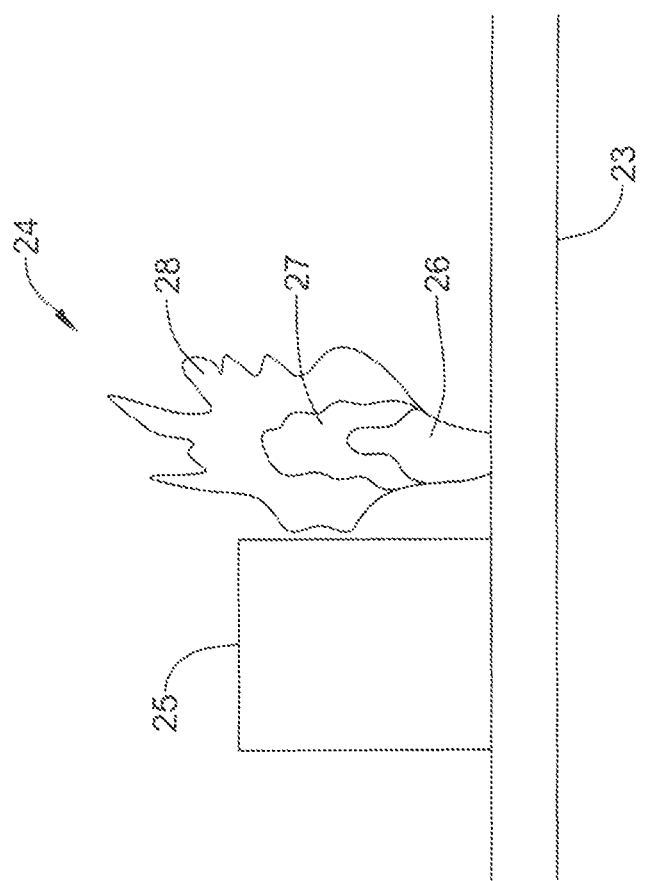

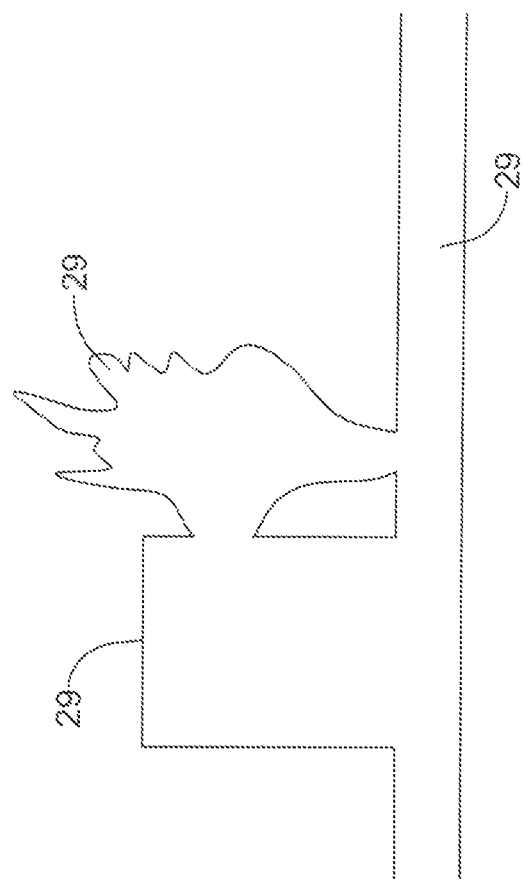

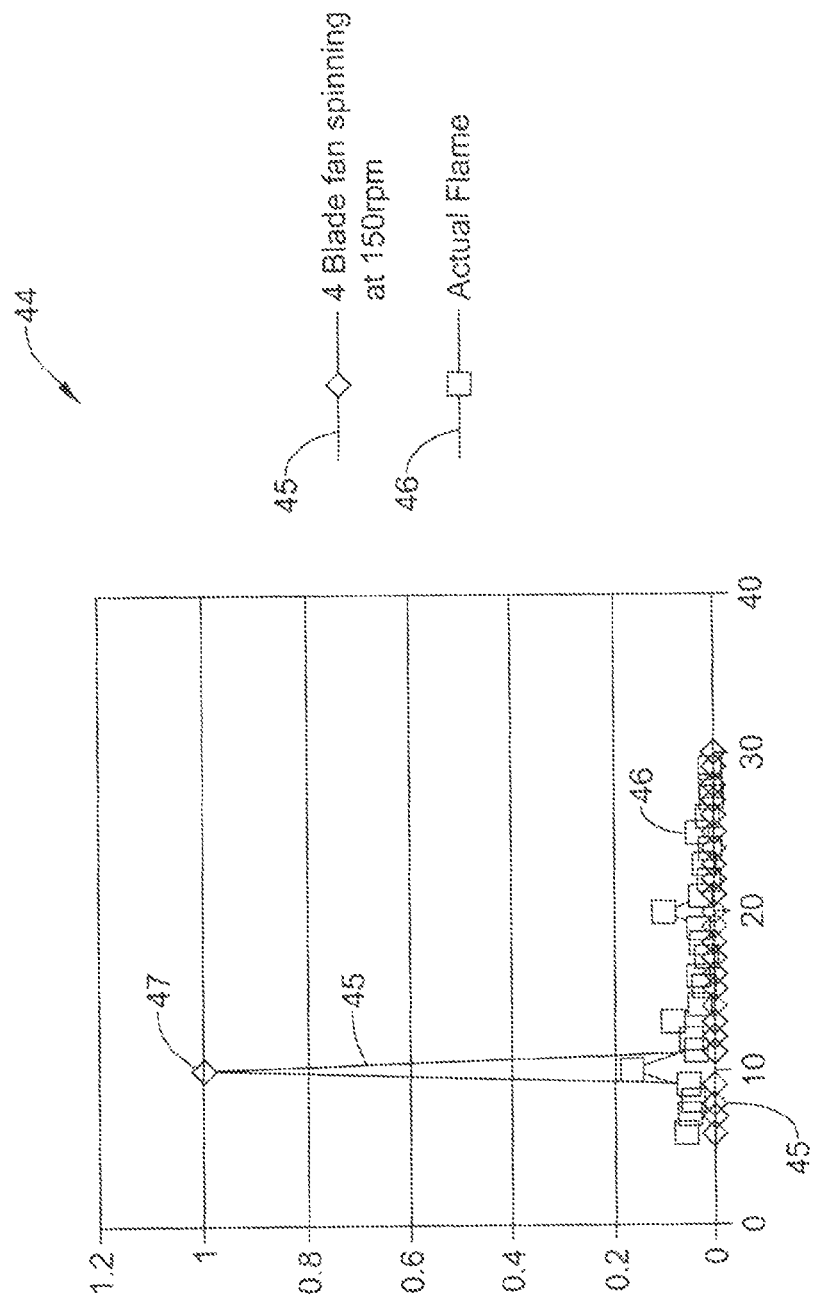

MWIR SENSOR FOR FLAME DETECTION

The present application claims the benefit of U.S. Provisional Patent Application No. 61/453,471, filed Mar. 16, 2011. U.S. Provisional Patent Application No. 61/453,471, filed Mar. 16, 2011, is hereby incorporated by reference.

BACKGROUND

The present disclosure pertains to detection and particularly to detection of phenomena. More particularly, the disclosure pertains to detection of hot objects.

SUMMARY

The disclosure reveals a system for detecting a flame. The system may discriminate between a detected hot object and flame. The system may be a camera-like structure incorporating an infrared sensor, a lens, and an element that filters out much of the long-wave infrared radiation. The sensor may receive radiation of a scene which forms an image on the sensor. The image may be provided to a processor that incorporates one or more modules to determine whether a flame is present in the scene.

BRIEF DESCRIPTION OF THE DRAWING

FIG. 6a is a diagram of a fire at a leak of a hot pipe with a hot object at the background;

FIG. 6b is a diagram of regions of a fire, a hot object and a hot pipe being detected as one region;

FIG. 10 is a diagram of a graph showing power spectral density versus frequency with an interrupting fan blade situated between a hot object and a detector.

DESCRIPTION

Figure 1A:
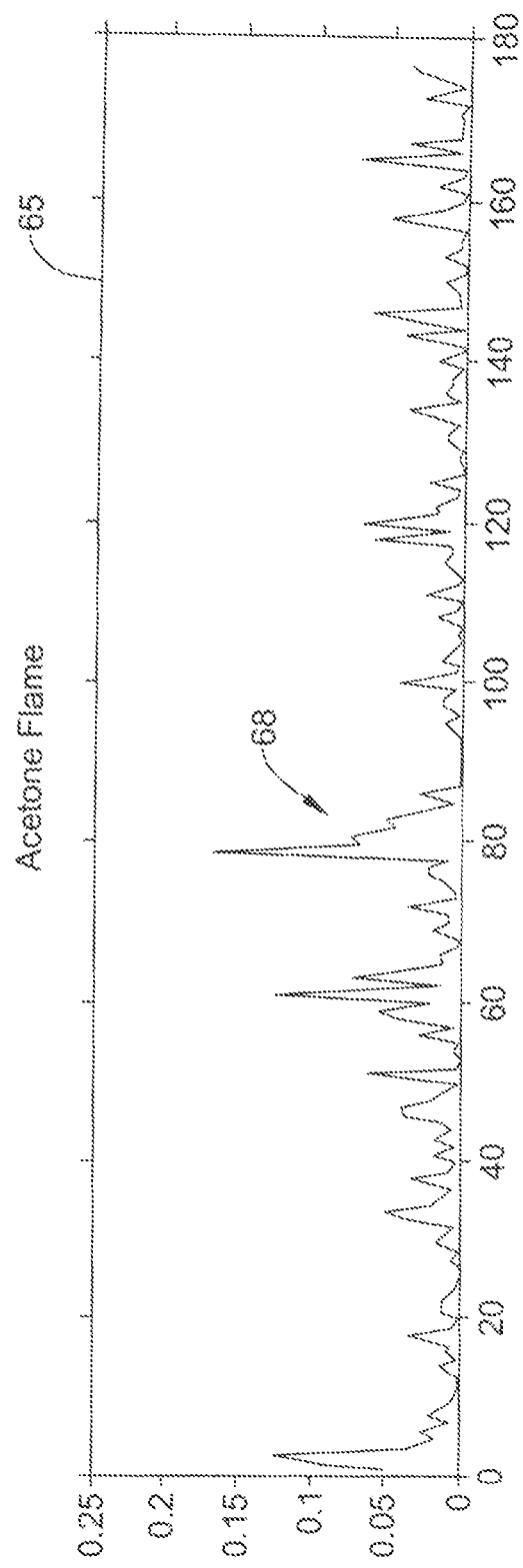
FIGS. 1a, 1b and 1c are diagrams of graphs showing a spatial temporal texture of a flame, a hot gun and a reflection, respectively.

It may be desirable to sense flames for monitoring either when desired flames are extinguished or when undesired flames are ignited. One approach may be to sense mid-wave infrared (MWIR) radiation from a flame. The present disclosure may describe a method and system for detecting flames in the MWIR with bolometer technology that is modified from long-wave infrared radiation (LWIR) detection. MWIR may have a wavelength from about 3 microns to 8 microns. LWIR may have a wavelength from 8 microns to about 15 microns.

A benefit of MWIR over LWIR sensing may be that the intensity ratio between a flame and its background is much larger in the MWIR band than that for the LWIR band and so it can be easier to discriminate a flame from objects that are hot. Even if a flame does not fill up an entire pixel, the intensity may be sufficiently great so that the flame will stand out among other objects. To sense objects in the MWIR may involve the use of cooled solid state InSb or InSb-like photonic detector materials. This may be necessary to achieve good temperature resolution; but in the case of a flame, such high temperature resolution may not be necessary.

A modified bolometer pixel array may be used. In some cases, a VOx detector pixel may have an absorber coating applied which lets it absorb in the MWIR where it would not normally absorb. This coating may be, for example, one that is used a scene projector emitter. It may be a metal with a sheet resistance of about 366 ohms/square applied under the bolometer pixel. Other sheet resistances may be acceptable. In a scene projector application, an absorber coating may be added to an HfN device that produces an MWIR emission. In the present case, this coating may be applied to a detector. A use of an $Al_2O_3$ window rather than a Si window on a vacuum package may ensure that only MWIR radiation reaches the array. The $Al_2O_3$ window may act as a filter that passes IR radiation having a wavelength below 6 microns to a magnitude less than the magnitude of the MWIR. A size of the bolometer array and pixel may depend on a particular application. For a known flame or a flame location, the bolometer may just be a single pixel staring at a fixed spot. For an identification of unknown flames, an array of bolometer pixels having a large FOV may be desirable.

A bolometer array may provide an image, rather than just a single point. Such an image may be useful in providing temporal, spatial and/or spectral discrimination, which may help reduce false positives in some flame detection applications.

An infrared bolometer array may detect radiation through a heating of thermally isolated pixels with infrared light. Thermal isolation of the pixel may be achieved by having the detector behind a transparent window in a vacuum environment where the support structure of the pixel has low thermal conductance. The low thermal mass of the thin pixel may make achieving time constants of twenty (20) microseconds possible. This appears compatible with video frame rates. In an imager, a lens may focus the light onto the detector array and each pixel may detect radiation from a particular scene location.

Bolometer detectors may be regarded to have been typically designed to detect radiation in the LWIR band because most light at thermal temperatures is noted to be in this band. These broad band detectors however may also be capable of detecting radiation in other bands unless the radiation is spectrally filtered by the windows, lenses, and/or other filters. This factor may distinguish bolometer detectors from quantum detectors which detect photons and which have a narrow range of spectral sensitivity. Bolometer pixel spectral absorption may normally be tuned to LWIR wavelengths by design with a rolloff at MWIR wavelengths. A slight modification to the gap between the pixel and the backplane may make the pixels more tuned to detecting MWIR radiation, although still be capable of detecting significant LWIR radiation.

The window that defines the vacuum environment may have its own spectral properties. By using Ge, the window may transmit beyond two (2) microns, while using Si, the window may transmit beyond one (1) micron. The long wavelength transmission of the package window may usually extend into the LWIR range. Other package windows such as sapphire may have a cutoff at about six (6) microns and then only transmit MWIR radiation to the array. The latter type of window with long wave absorption may make it impossible for the array to "see" any LWIR radiation, and thus window would restrict the spectral range of bolometer detection to MWIR radiation.

For a thermal source, MWIR radiation is not necessarily significant but, as more sources having higher temperatures are in the scene, the broad band LWIR radiation may equal or exceed the narrow band MWIR radiation from the flame gases, in particular, CO2. Thus, it appears desirable to reduce the non-flame emission that is detected by the bolometer to a level below the level of the flame so that the bolometer detector can operate in a dark field environment except for a few bright sources.

A sapphire (e.g., $Al_2O_3$) window or coating, rather than a Si window on the vacuum package, may allow MWIR radiation to reach the array while filtering out some or virtually all of the LWIR radiation. In some cases, AlON™ (Surmet Corporation) may be used to form the window or coating, or it may be placed between a window and the bolometer, to permit MWIR radiation to reach the array while filtering out the LWIR radiation of a magnitude greater than the magnitude of the MWIR. ALON may be an optical ceramic which is transparent from the near ultra violet to the near infrared wavelength (0.25 micron to 4.6 microns). ALON may have a composition of $Al_{23-1/3x}O_{27+x}N_{5-x}$.

The present fire detection system may have an objective to detect hazardous fire as early as possible from a continuous stream of images provided by an array. Assumptions for the system may incorporate a stationary array, a constant field of view, lighting condition changes (e.g., an outdoor environment), some regions in the field of view being identified as non-hazardous fire regions, and knowledge the optical distortions of the system.

Flame detection may be performed once the hot spot or spots are identified. To differentiate hot sources by a thresholding of MWIR light intensity within an image (which can differ from a pyro) may be to discover virtually all hot sources in a field of view. The light may be filtered with sapphire for best results but the filtering could involve a dual band filter. The lens of a detection camera may be outside the housing and the bolometer of the camera may be inside the housing with the sapphire window being both the filter and the protective interface of housing to the outside world. Each hot spot may be identified in space. Each hot source spot or source type may be differentiated by analyzing flicker from a frame-to-frame intensity variation of total radiation of an array and/or of individual pixels.

There may be gradient changes in a vertical and horizontal direction for a flame. This may be regarded as spatial flicker. A changing gradient may mean that the flame is growing and shrinking vertically and horizontally, and the edges are changing shape continually. Gradient changes in X and Y directions may be important to declaring a flame. On top of this, there may be temporal flicker, which is how the mean intensity of the flame region changes relative to time, which may amount to a differentiation by analyzing flicker from a frame-to-frame intensity variation of total radiation and/or of individual pixels. Here is where one may find the power spectral density (PSD) across a specific range. A flat PSD may indicate a hot source. A PSD with few peaks may indicate a flame. A sharp PSD may indicate an artificially modulated source.

Figure 1B:
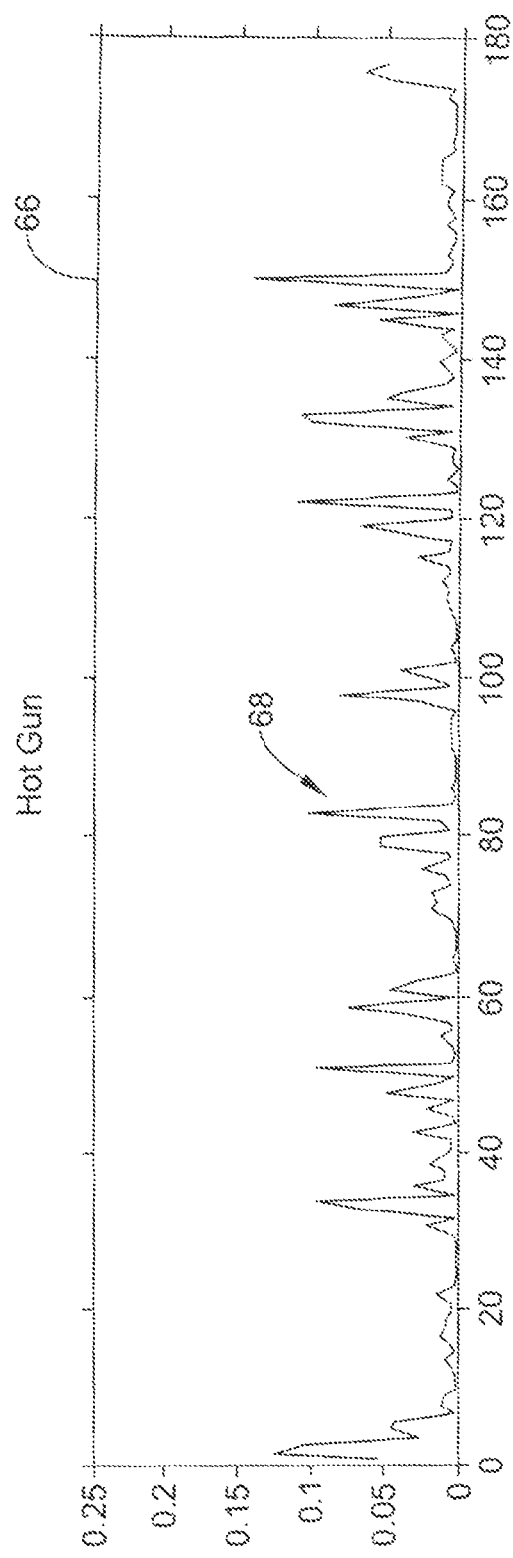
Figure 1C:
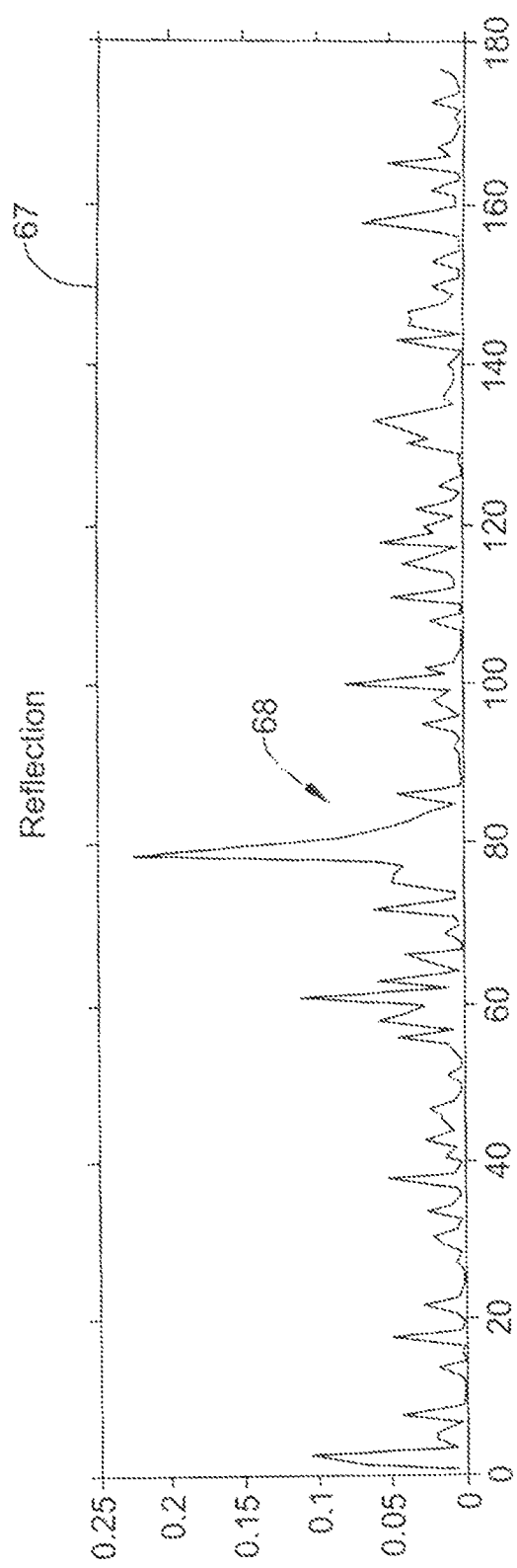

Characteristics of a flame compared to those of a hot item, object, spot, region or the like, but not a flame, such as a hot gun may be noted. Various graphs may indicate characteristics relative to, for example, an acetone flame such as intensity of a flame which may be about two times greater than that of a reflection and a hot gun, and that spatial and temporal textures for classification of a flame might be regarded. The characteristics may be utilized for detection of regions of interest. FIGS. 1a, 1b and 1c are graphs 65, 66 and 67 showing a spatial temporal texture of an acetone flame, a hot gun and a reflection, respectively. It may be noted that the plot of the flame shows more variation along the vertical direction at locations 68 than that of the heat gun and the reflection of the flame.

Figure 2A:
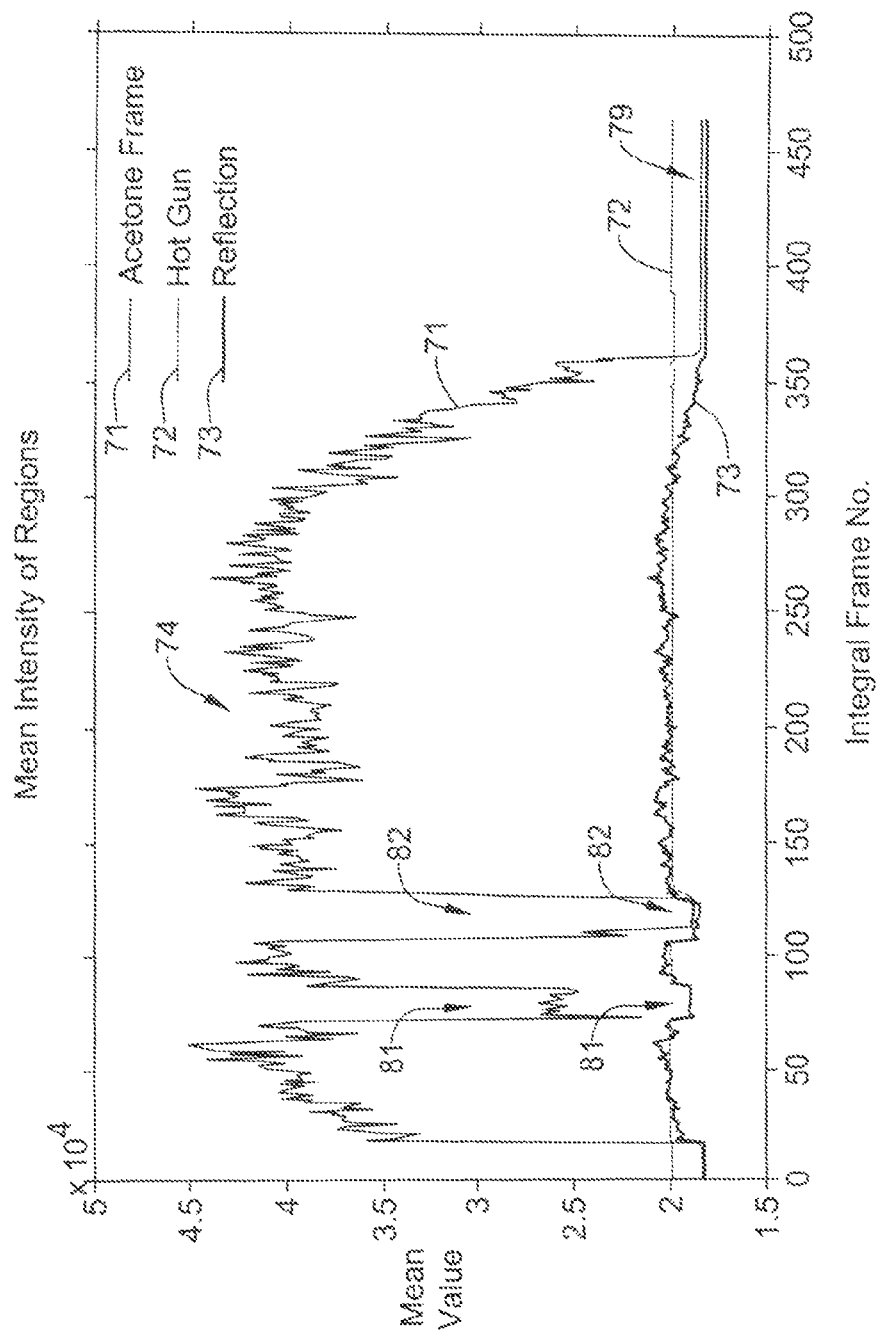
FIG. 2a is a diagram of graph showing a mean value versus integral frame no. to reveal a mean intensity of regions for a flame, hot gun and reflection of the flame.

FIG. 2a is a graph of mean value versus integral frame no. to reveal mean intensity of regions for the acetone flame, hot gun and reflection of the flame, as indicated by curves 71, 72 and 73, respectively. Location 74 of curve 71 may indicate a higher mean flame intensity where ripple equals time flicker. Location 79 of curves 71, 72 and 73 indicate where the flame is out. Locations 81 of curves 71, 72 and 73 indicate that a sapphire window is inserted between the flame and the hot gun, respectively, and a detector providing the signals for the corresponding curves. Locations 82 of curves 71, 72 and 73 indicate that a MWIR bandpass filter is inserted between the flame and the hot gun, respectively, and a detector providing the signal for the corresponding curves.

Figure 2B:
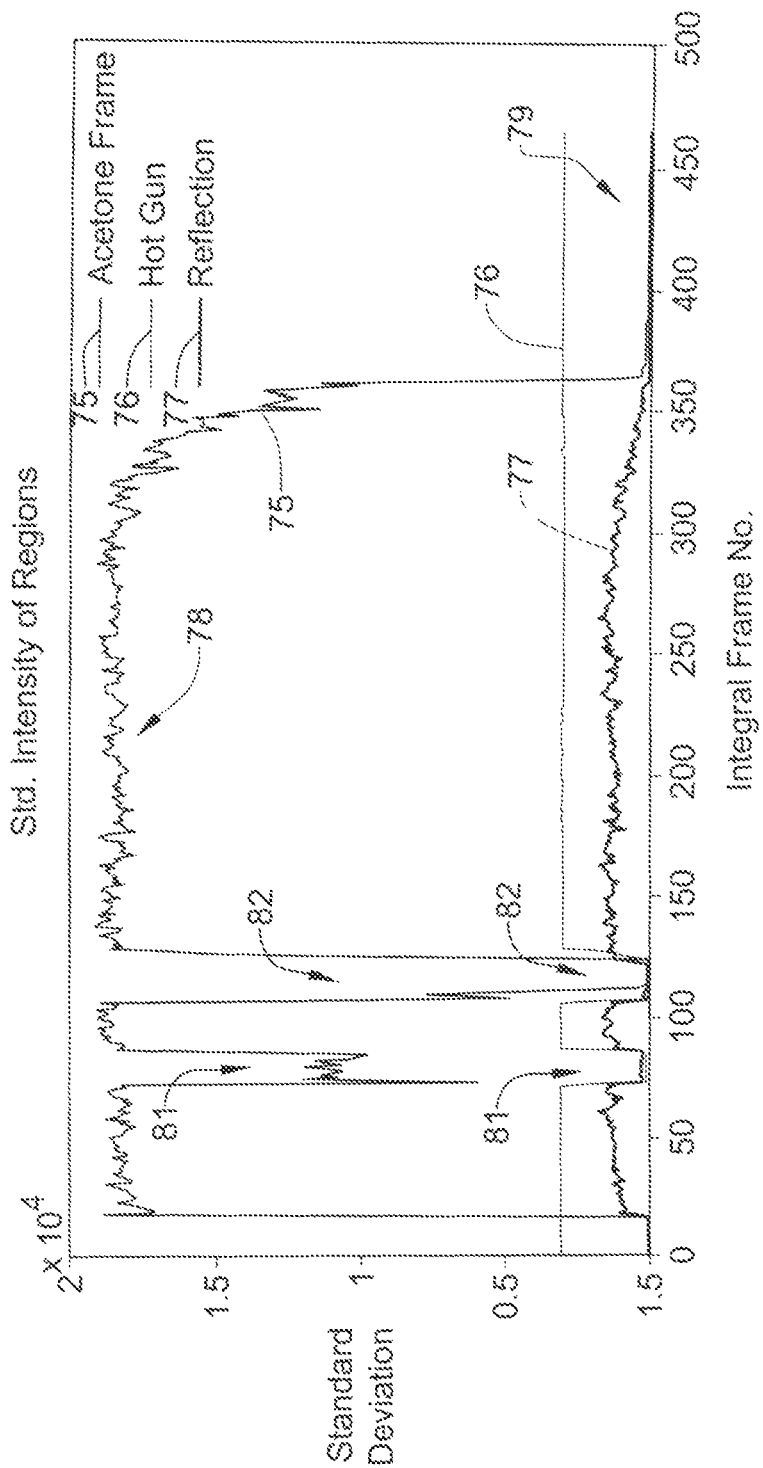
FIG. 2b is a diagram of a graph of standard deviation versus integral frame no. to reveal standard intensity of regions for a flame, hot gun and reflection.

FIG. 2b is a graph of standard deviation versus integral frame no. to reveal standard intensity of regions for the acetone flame, hot gun and reflection and indicated by curves 75, 76 and 77, respectively. Location 78 of curve 75 may indicate that a higher σ equals a higher spatial flicker. Location 79 of curves 75, 76 and 77 indicate that the flame is out. Locations 81 of curves 75, 76 and 77 may indicate that a sapphire window is inserted between the flame and the hot gun, respectively, and a detector providing the signals for the corresponding curves. Locations 82 of curves 75, 76 and 77 indicate that a MWIR bandpass filter is inserted between the flame and hot gun, respectively, and a detector providing the signal for the corresponding curves.

Figure 3:
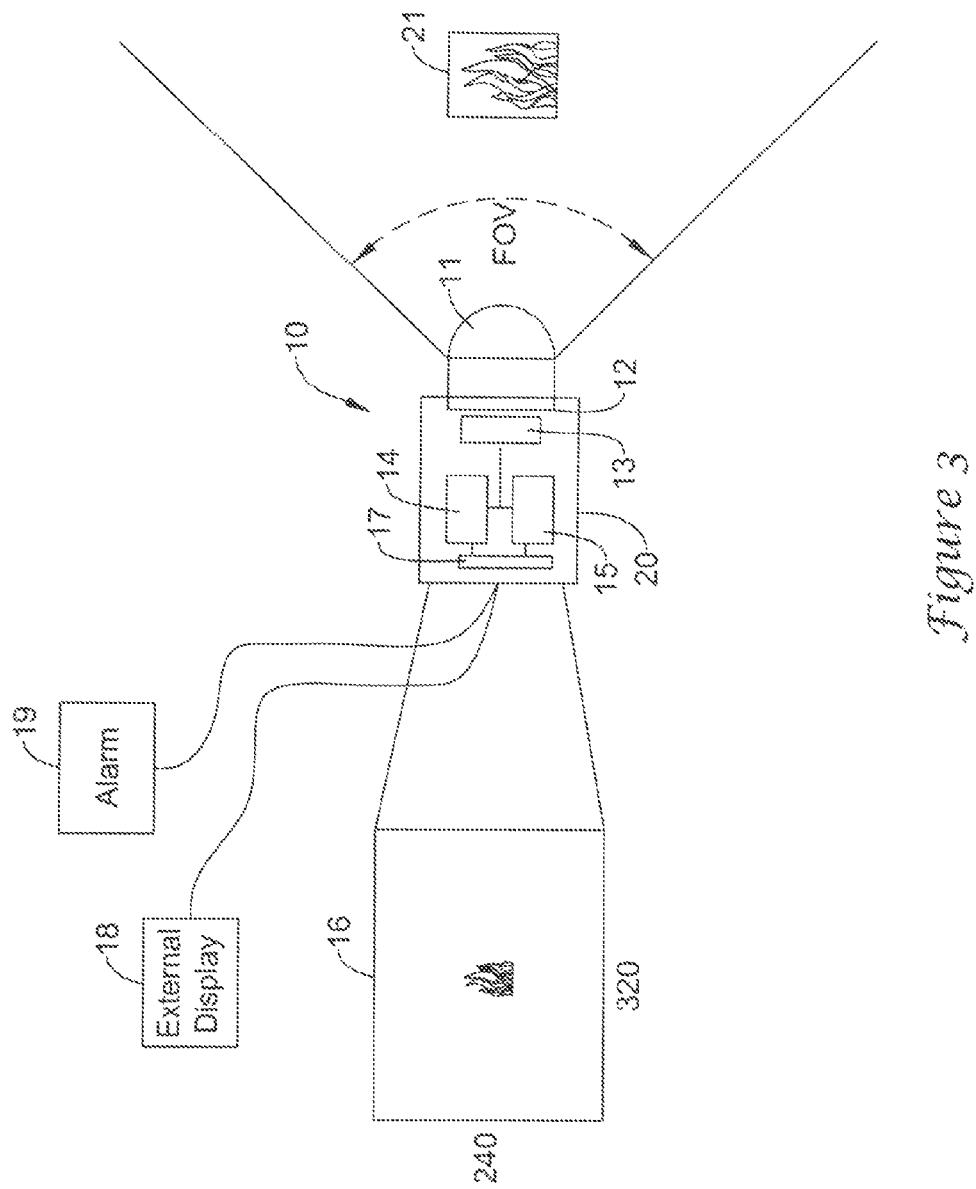
FIG. 3 is a diagram of a mid-wave infrared detector.

FIG. 3 is a diagram of an MWIR detector 10. A wide angle lens 11 may collect the radiance from a large field of view (FOV), such as, for example, 90×90 degrees or 120×80 degrees. An explosion-proof sapphire window 12 may be placed between lens 11 and an MWIR bolometer array 13. Detector 10 may have an explosion-proof housing 20. Window 12 may filter out much of the long wave IR radiance to a magnitude less than that of MWIR. There is not necessarily a specific filter other than window 12, but a narrow CO2 filter might be utilized. The MWIR bolometer array 13 may be a high-resolution, high-dynamic-range array, for example, an array with 320×240, 640×480 pixels, or other size, and 14 or other number of bits per pixel. Bolometer 13 may have other specifications. Bolometer 13 may be a micro-bolometer.

An image 16 output from the bolometer array 13 may be sent to a processor 14 and a memory 15. Processor 14 may analyze an image 16 on array 13 and detect the presence of a fire 21 while rejecting any false positives. Image 16 may have one or more bright areas on a dark area. Memory 15 may store image 16 and intermediate results of analyses of image 16 from processor 14. When a fire is detected, processor 14 may interact with the memory 15 module and send an alarm signal and image 16 with a highlighted fire region to a communication interface 17. Interface 17 may then transmit image 16 and processor 14 results to an external display 18 and/or alarm system 19.

Another version of detector 10 does not necessarily have processor 14 and memory 15 in the MWIR detector 10. Communication interface 17 may also be modified to continuously transmit the MWIR bolometer 13 images 16 via a wired or wireless network. Processor 14 and memory 15, in such version, may be located at a remote processing unit, such as a PC, server or a cloud computing server. Processor 14 may analyze the image and detect the presence of a fire 21 while rejecting any false positives.

Figure 4:
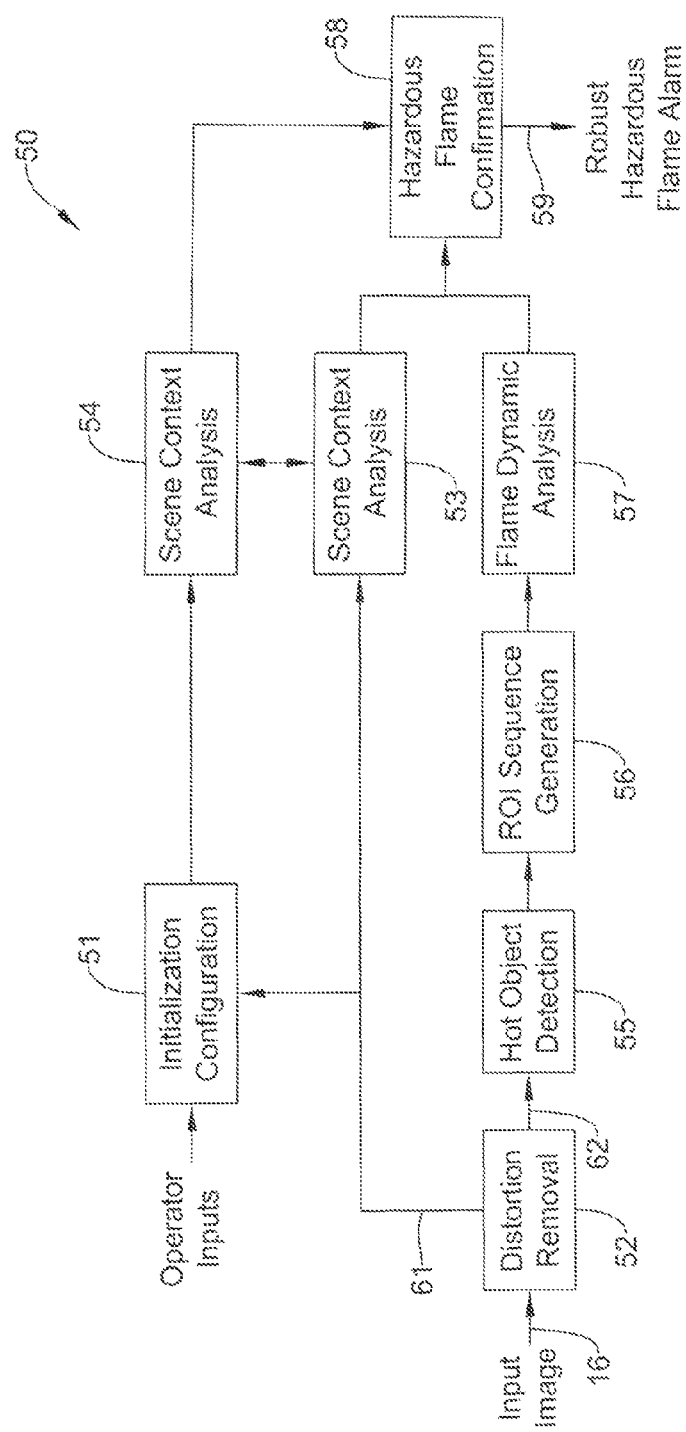
FIG. 4 is a diagram of a flame detection approach.

A flame detection approach 50 may be shown in a block diagram of FIG. 4. Operator inputs may be entered into an initialization and configuration module 51. An input image 16 from array 13 may be sent to a distortion removal module 52. Standard distortion removal procedures may be applied at module 52. Distortions may mainly be due to the wide field of view optics, sensitivity and temperature dependence of bolometer array 13. Distortion removal may remove optical distortion in the image based on the known optical characteristics. Some of the procedures at module 52 may include, but not be limited to, non-uniformity pixel correction based on periodic calibration, and optical aberration correction at the image edge areas. The corrected image 16 may then be split into two images based on a threshold—a low order bit image 61 and a high-order-bit image 62. The low-order-bit image 61 may be generated by setting those pixels from the corrected image that exceed the threshold to be the threshold value while keeping the remaining pixel values the same. The low-order-bit image 61 may be sent to the initialization and configuration module 51 and a scene context analysis module 53. The operator at the input of module 51 may identify the locations where a non-hazardous flame often occurs in view of the low order bit image 61. Scene context analysis module 53, using the lower order bits of the pixels in image 16 which can effectively be image 61, may outline the structures and open areas in the scene, rank them for risks of a potentially hazardous flame, and evaluate the vicinity of the hot objects for abnormal activities.

The operator may identify locations where a non-hazardous flame often occurs. During the setup and installation, the operator, based on a low-order-bit output image 16 from array 13, may identify regions where a flame is normal and a detected fire can be ignored. An example of such area may be a top of a flare stack, where the wasted gas is burnt. Processor 14 may perform a segmentation and region analysis to determine the different observed regions within the field of view. Various algorithms from computer vision technology may be applied. One skilled in the art may have the know-how to implement these algorithms. Based on the shape, size and intensity of the segmented regions within the field of view, a potential hazard map 54 may be generated. The map may indicate a likelihood of an occurrence of a fire in each region. For example, a thin, long, high-intensity region, which is likely a hot pipe, may be a high risk area. Likewise, a large rectangular, high intensity region, which may be a hot engine, furnace, or generator, may also be a high risk area. On the other hand, a large, irregular, low or medium intensity area, which may be the sky or the sea, may have a low probability of having a fire. During an installation, an operator or installer may be prompted at module 51 to aid in a specification or revision of the potential hazard map 54.

In operation, processor 14 may receive input images from the bolometer array 13. The scene context analysis module 53 may perform one additional function—occlusion detection. Various occlusion functions may be applied. When an occlusion is detected, the system may send an occlusion signal to display 18 and alarm 19 via communication interface 17. Inputs from the initialization module 51 and from the scene context analysis module 53 may form a potential hazard map at module 54 which classifies the scene of image 61 into regions of risks having a hazardous flame.

The high order bit image 62 may go from module 52 to a hot object detection module 55. Module 55, using the high order bit of the pixels of image 16, which is effectively image 62, may determine potential flame areas that exceed a certain predefined temperature threshold. The determined potential flame area information may be input to a region of interest (ROI) sequence generation module 56. The generated ROI sequences may go to a flame dynamic analysis module 57. Module 57 may compute spatial characteristics, temporal behaviors, such as flicker rate, movements and growth rate, of detected hot objects. The behaviors may be assessed against those of a flame at module 57. Further details of module 57 may be indicated in FIG. 5. Information from the potential hazard map module 54, scene context analysis module 53 and the flame dynamic analysis module 57 may go to a hazardous flame confirmation module 58. Module 58 may combine the information from modules 53, 54 and 57 to determine a presence of a hazardous flame while rejecting flame-like nuances. An output 59 of module 58 may be regarded as a robust hazardous flame alarm.

One approach of flame detection does not necessarily apply the scene context analysis, the hazard flame confirmation and a creation of the potential hazard map. This approach may work well in a benign scene where many complex structures are absent.

The high-order-bit image, which can be created by setting its pixels below the threshold to zero, may be sent to a hot object detection module 55. This module may apply another threshold to detect regions of interest (ROI) that are hot sources. Each ROI may be dilated n times. A dilation may be in contrast to a usual dilation operation on an image, which could results in merging multiple regions into one region. Dilation on each ROI will not necessarily merge ROIs. This approach may be crucial in separating a flame from nearby hot objects.

Figure 6C:
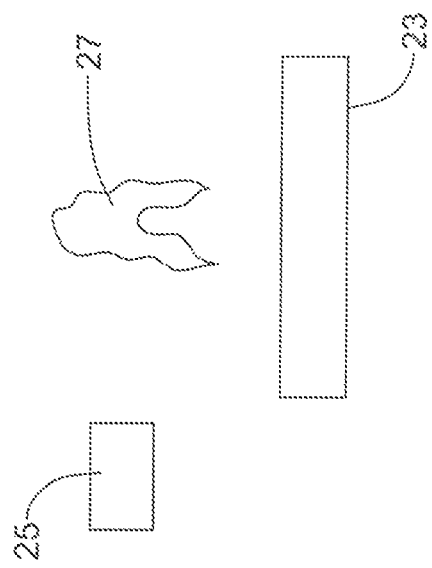
FIG. 6c is a diagram of the regions of FIG. 6b as three incomplete regions.

FIG. 6a shows a fire 24 at a leak of a hot pipe 23 with a hot object 25 at the background. Fire 24 may often have three regions: inner core 26, interconal 27 and outercone 28. The hottest region of the three may be the interconal 27. If a low threshold is applied, virtually all regions of the fire 24, the hot object 25 and the hot pipe 23 may be detected as one region 29, as shown in FIG. 6b, whose characteristics do not necessarily resemble that of a fire anymore. That is, a low threshold may yield one fused region. Consequently, the fire will not necessarily be classified correctly. When a high threshold is applied, the interconal region 27, part of the hot object 25 and the pipe 23 may be detected as three regions of interest, which also do not necessarily accurately represent the three objects. That is, as shown in FIG. 6c, a high threshold may yield three incomplete regions. Thus, dilation of each region may yield a more complete segmentation of the region. Another approach may apply a region growing technique, such as active contour, or snake, that may quite accurately segment each region. However, this approach may be very computationally intense and would be more suitable when a high processing power processor is used.

Figure 5:
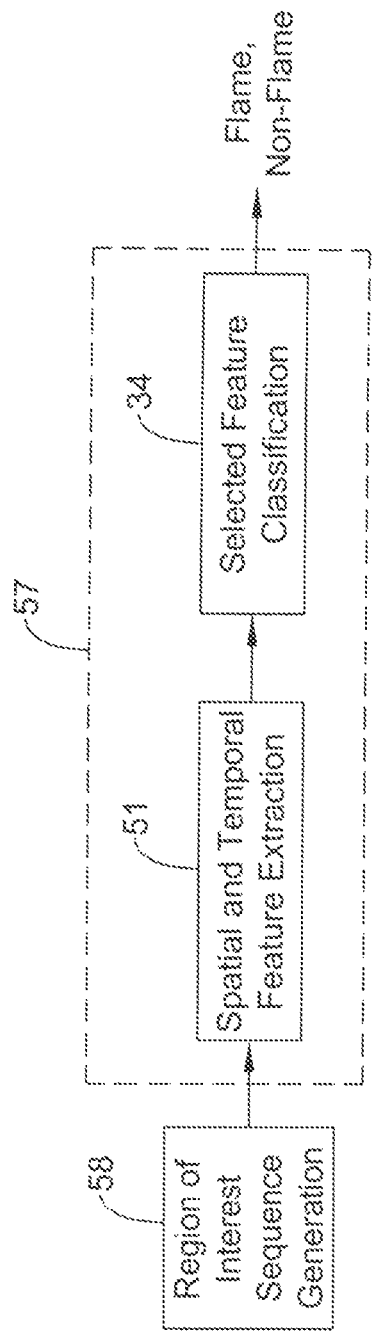
FIG. 5 is a diagram of two operations within a flame dynamic analysis module of the detection approach.
Figure 7:
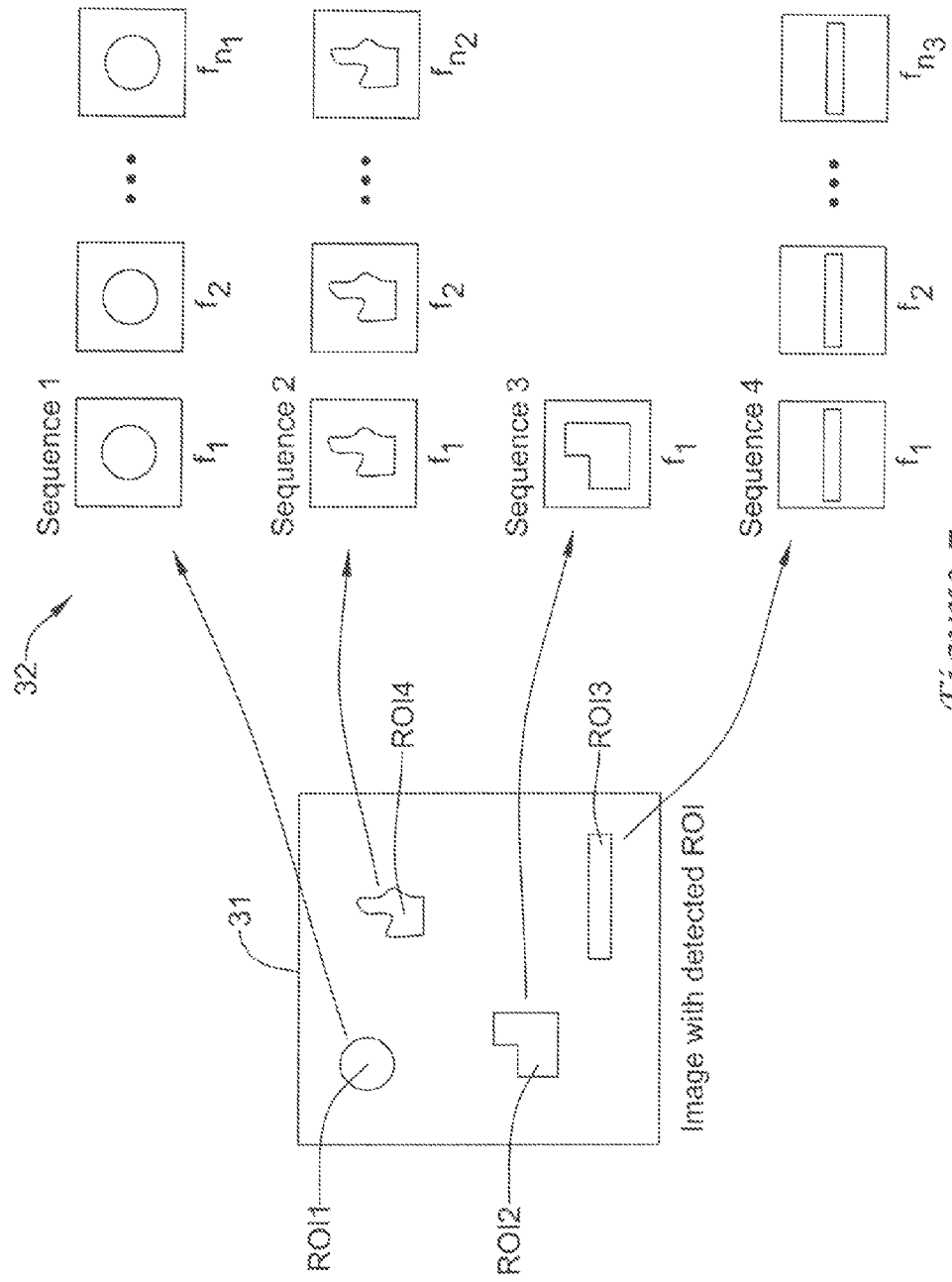
FIG. 7 is a diagram of an integration of detected regions of interest into sequences.

FIG. 7 is a diagram of an integration of a detected ROI into ROI sequences 32. The location of the detected ROI in an image 31 may be compared against those of the ROI sequences with frames $f_1, f_2, \ldots, f_{nx}$, where x is of $ROI_x$. When the locations of a detected ROI and a ROI sequence match, then the detected ROI may be added and aligned to the ROI sequence. Information related to the image 31 sequence, such as a number of frames in the sequence and latest update time, may be updated. For an example in FIG. 7, ROI1, ROI4, and ROI3 may be matched with and be added to ROI sequences 1, 2 and 4, respectively. If the location of a detected ROI does not match with any location of the established ROI sequence, a new ROI sequence may be created. For example, ROI sequence 3 may be created based on detected ROI2. Once the match and association are completed, the integration process may assess the maturity of each ROI sequence. When the number n of detected ROI's in a ROI sequence reaches a predetermined number, m, then the ROI sequence may be mature and be forwarded to the flame dynamic analysis module 57 for classification (FIGS. 4 and 5). The number m may be determined based on the input frame rate and the expected flame behavior, e.g., flicker rate. In one approach, k out of the m latest frames in a matured ROI sequence may be retained. This may allow a new detected ROI to be added to the retained sequence. A more robust and faster response time may be achieved. In another approach, the matured ROI sequence may be removed and a new ROI sequence be created. If the latest update time of a ROI sequence is aged compared to the current time, then the ROI sequence may be removed. This operation may reduce false positives that are generated by spurious detection and moving hot sources, such as the hot engine of a moving vehicle.

FIG. 5 is a diagram of two operations that may be performed in the flame dynamic analysis module 57 (FIG. 4), which classifies the input ROI sequence, from module 56, to be a flame or non-flame. A spatial and temporal feature extraction module 33 may compute a set of characteristic features that differentiates the flame and non-flame regions. A selected feature classification module 34 may apply a pattern recognition technique to determine whether the feature set belongs to that of a flame or non-flame.

To reiterate, the flame dynamic analysis module 57 of FIG. 4 may determine the class of a hot region of interest. Module 57 may incorporate modules 33 and 34 as noted in FIG. 5. An input to the spatial and temporal feature extraction module 33 may be a region of interest sequence. The feature extraction module 33 may incorporate histograms of an x-gradient, a y-gradient and a temporal gradient. There may be Z-scores of area variation and intensity variation in time. Also, feature extraction may involve a PSD estimate of intensity of the region of interest. An output of extracted features from module 33 may go as an input to the selected feature classification module 34. Classification of features at module 34 may incorporate virtually all or a selected subset of the extracted features. A statistical classifier, trained with a flame and a non-flame sample, may determine the class of the region of interest at module 34. An output of module 34 may be a determination of the region of interest as a flame or a non-flame. In one approach, a support vector machine (SVM) may be the classifier in module 34.

Figure 8A:
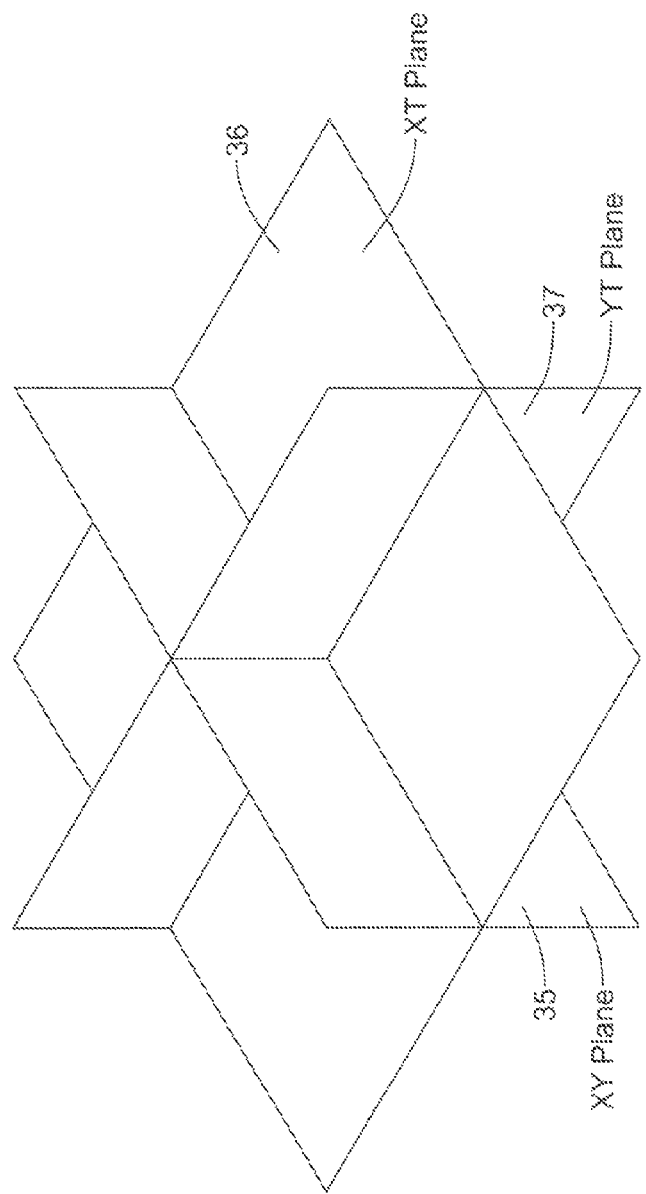
FIG. 8a is a diagram showing three planes relating to a pixel representation of a flame.
Figure 8B:
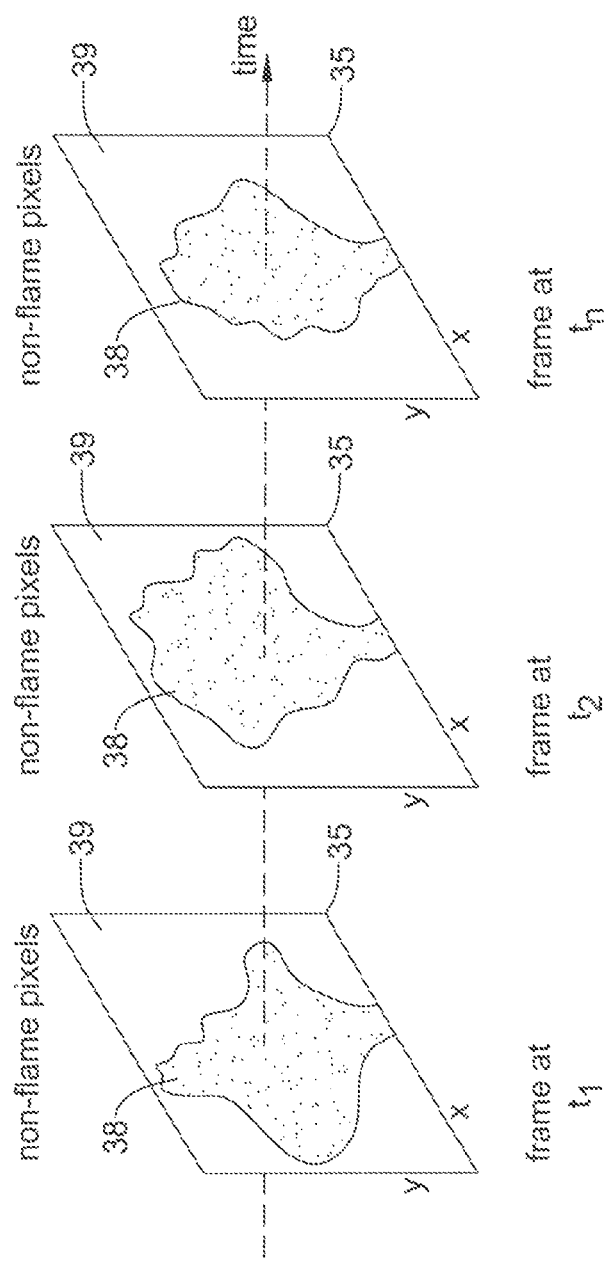
FIG. 8b is a diagram showing a pixel representation of a flame appearing in contrast with non-flame pixels along a time axis.

FIG. 8a is a diagram showing three planes 35, 36 and 37 and FIG. 8b is a diagram showing a pixel representation of a fire or flame 38 appearing in contrast with non-flame pixels 39 in plane 35 along a time axis. The present system may compute the fire dynamic textures using the local binary pattern—three orthogonal planes (LBP-TOP) approach. The system, however, may compute the co-occurrence just from the detected hot pixels in an ROI sequence. In many other dynamic textures, such as sea-waves, foliage, and face expression, the volume of the ROI sequence may be a rectangular prism. In these cases, accurate representation of the LBP-TOP dynamic textures may be computed from virtually all pixels in the prism. Treating the fire sequence as a rectangular prism for the LBP-TOP dynamic texture computation might be a challenge. Many of the pixels, e.g., non-flame pixels, and their neighborhoods in the rectangular prism, e.g., at the corners, do not necessarily belong to a fire. If included in the LBP-TOP histogram, these pixels might create an artificial peak at the low end since they may have zero values and do not necessarily vary in the three planes.

Three classes of spatial, temporal features may be computed. A first class may be a dynamic texture. Dynamic textures may be textures with motion that exhibit some stationary properties in time. Fire, smoke, sea-waves, and a moving cloud may exhibit dynamic textures. Many approaches appear to have been proposed and applied to model dynamic textures. One approach may use an extension of local binary pattern (LBP) referred to as a volume local binary pattern (VLEP) or its simplified, computational efficient LBP-TOP. A local binary pattern may compute the local variations, encode the variations in binary pattern and compute the co-occurrence of the binary in a histogram. The LBP-TOP may concatenate a local pattern on three orthogonal planes. As shown in FIG. 8a, they may incorporate XY plane 35, XT plane 36 and YT plane 37, where XY is of the spatial plane 35 at time T, along a time axis, XT is of the horizontal-time plane 36, and YT is of the vertical-time plane 37. XY plane 35, presented as frames at t1, t2 and tn, may show flame pixels 38 and non-flame pixels 39, as shown in FIG. 8b.

Figure 9A:
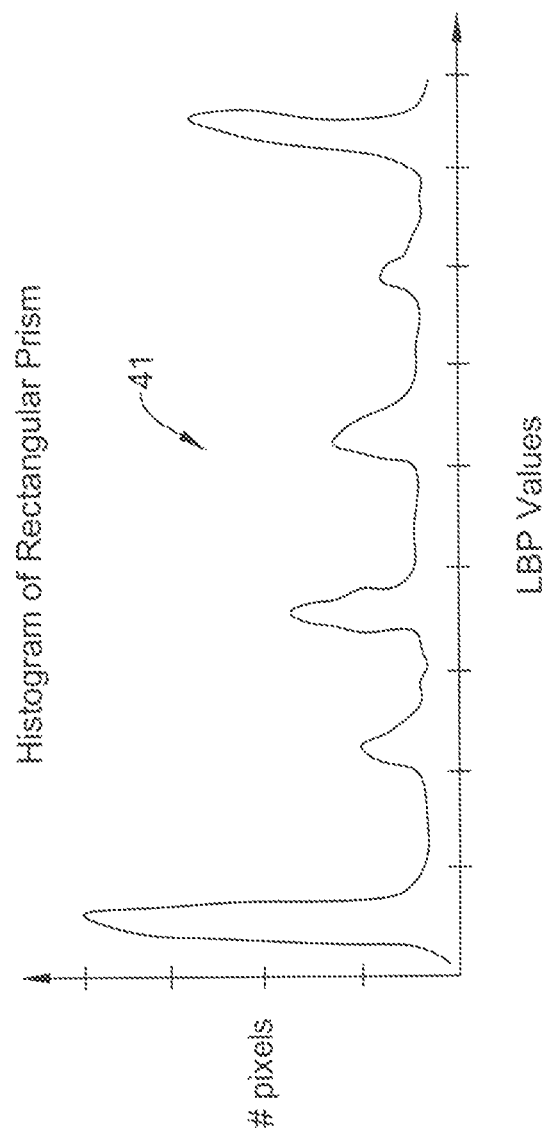
FIG. 9a is a diagram showing a histogram of a rectangular prism in which non-flame pixels may be incorporated.
Figure 9B:
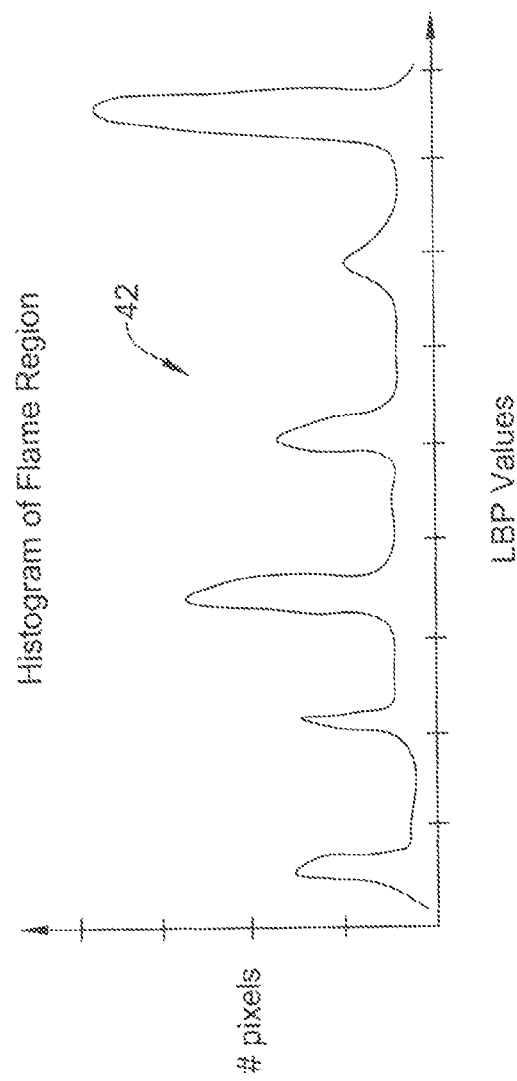
FIG. 9b is a diagram showing a histogram of a flame region in which the non-flame pixels may be excluded.

FIG. 9a shows a histogram 41 of the rectangular prism in which the non-fire or non-flame pixels 39 of the frames in FIG. 8b may be included. FIG. 9b shows the histogram 42 of the flame region in which the non-fire pixels may be excluded. Excluding the non-fire pixels may be a key factor because the signatures of many hot sources are stable and thus have a peak at the low end of the histogram.

A second class of spatial temporal features may compute the variations of the intensity and the area of a ROI sequence. The radiated heat, shape and size of a fire may change in time. These changes may depend on the type and amount of fuel, and many environmental factors, such as wind speed, humidity, and surrounding temperatures. Furthermore, the sensed pixel intensity and area of a fire in an image may depend on the distance of the fire from the MWIR bolometer 13. Normalization may be necessary in order to characterize the various intensity and area variations in a ROI sequence for their proper classifications. Z-score intensity and Z-score area features may be computed. Given a ROI sequence, which has a ROI in frames $f_1, f_2, \ldots, f_n$, the Z-score intensity feature, which is a sequence of Z-score values, may be computed as follows:

1. The mean intensity, $\mu_1, \mu_2, \ldots, \mu_n$ of the ROI in each frame is computed.
2. The standard deviation, $\sigma_1, \sigma_2, \ldots, \sigma_n$, of the ROI in each frame is computed.
3. The sequence mean intensity, $ă$, is computed as the mean of $\mu_1, \mu_2, \ldots, \mu_n$.
4. The Z-score intensity feature, $I_z$, may be computed as $$I_Z(i) = (\mu_i - ă)/\sigma_i$$

Computation of the Z-score area feature, which can also be a sequence of Z-score values, may appear similar and simpler. Given a ROI sequence, whose areas of the ROI are in frames $f_1, f_2, \ldots, f_n$, are $A_1, A_2, \ldots, A_n$, the Z-score intensity feature may be computed as:

1. The mean area, $\mu_A$, is computed from $A_1, A_2, \ldots, A_n$.
2. The standard deviation of the area, $\sigma_A$, is computed from $A_1, A_2, \ldots, A_n$.

3. The Z-score area feature, $A_Z$, is computed as $$A_Z(i) = (A_i - \mu_A)/\sigma_A.$$

The third class of features may analyze the modulation characteristic of the ROI sequence. Since the detected ROIs in MWIR bolometer array 13 may pick up flames and very hot bodies with very similar intensities, flicker can be used to separate the two classes of regions. Flames tend to flicker between 10 to 20 Hz, and may have a relatively random distribution about the 10 Hz fundamental frequency. Hot objects will generally not necessarily flicker at all. If they do, it may mean that something in front of the hot object is modulating its IR irradiance before it reaches the detector. This may happen in many different circumstances. For example, there may be an object (e.g., water or a stainless steel object blowing in the wind) off which a hot body IR radiation is reflected. It may also happen if some gyrating object (i.e., a fan, flag, and so forth) partially obscures the hot object, modulating its transmitted intensity.

Some modulators, like a fan, may have a very periodic signature, which can show up in a Fourier transform of the detected hot body. For instance, a fan or rotating body may have a very pronounced peak. In a theoretical example, as illustrated by a graph 44 of power spectral density (PSD) versus Hz in FIG. 10, a fan may sit between a hot object and a detector. The graph may show a power spectral density of a flame and modulated heat source. The fan may have four blades and rotate at 150 RPM. Since there are four blades per revolution, and the fan spins at 2.5 rotations per second, resulting in the flame being obscured by a fan blade at 10 Hz as shown by plot 45. Plot 46 may be of an actual flame. One may see a sharp peak 47 of plot 45 at 10 Hz. On the other hand, a flame may have a much more spread out power spectral density, with relatively equal power at a few flickering frequencies. This approach may be one way to separate the modulated hot bodies from the actual flame sources. Flapping flags and reflections off of water may relatively be unlikely to have flicker in exactly the same band (i.e., a reflection off water may be discontinuous to the observer in that it may consist of a thousand little sparkles, and not necessarily be a continuous shape), so one may see an extremely low power spectral density in the 10 Hz range. That may also be a giveaway in that the object is not necessarily a flame. One may need a nonzero, flat PSD in the range from 5 Hz to 25 Hz (or 15 Hz, which is a maximum unaliased frequency in the case of the present camera) to declare that what one is seeing is a flame and not a modulated hot body.

In FIG. 5, a selected feature classification module 34 may determine the class of a ROI sequence based on a subset of the three classes of features. The subset of features may be selected based on the complexity of the operation scenarios. In particular, an indoor scenario may be less complex due to its better environmental control capability, whereas the outdoor scenario might be affected by the weather, sun and other natural phenomena. Thus, classifiers may be fine tuned to the specific applications and operation scenarios. Many state-of-the-art statistical classification approaches may be applied in selected feature classification module. In one version of the present system, a support vector machine classifier may be used. Another version of the present system may use an AdaBoost classifier.

To recap, a flame detector may incorporate an infrared sensor, a lens situated at a first distance from the infrared sensor, and a long wave infrared filter situated at a second distance from the infrared sensor. Infrared radiation from a scene may promulgate through the lens and the filter, in either order, to the infrared sensor. Long wave infrared radiation of the infrared radiation from the scene between the filter and the infrared sensor may have a magnitude less than the magnitude of mid wave infrared radiation of the infrared radiation from the scene between the filter and the infrared sensor.

The detector may further incorporate a camera housing holding the infrared sensor, the filter and the lens in place relative to one another. The filter may permit primarily infrared radiation having less than an eight micron wavelength to promulgate from the scene to the sensor.

The sensor may be a bolometer. The filter may be selected from a group consisting of a sapphire window, AlON material, and a dual band $CO_2$ and $H_2O$ filter, and so forth.

The detector may further incorporate a processor connected to the sensor for receiving an image from the sensor of the scene. The processor may incorporate a module for seeking one or more regions of interest in the image that exceed a threshold temperature, a module for extracting spatial and/or temporal features from each region of interest, and a module for classifying the spatial and/or temporal features to determine a class of a region of interest. A class may indicate a likelihood of the region of interest being a flame.

Spatial and/or temporal features from each region of interest may incorporate flicker rate of the region, movements of the region, growth rate, of the region, and/or other spatial and temporal characteristics of the region. The processor may further incorporate a module for assessing the spatial and/or temporal features against similar features of a reference flame.

The processor may also further incorporate a module for analyzing a context of the scene by outlining areas of the scene in the image, a module for ranking the areas of the scene in the image according to an amount of risk in having a hazardous flame, and/or a module for confirming a hazardous flame.

Extracting features may be based on histograms of x, y and/or temporal gradients of the image, Z-scores of area variation in time of the region of interest, Z-scores of intensity variation in time of the region of interest, and/or a power spectral density estimate of an intensity in time of the region of interest.

Classifying features may be based on one or more features extracted from each region of interest, a statistical classification, trained with flame samples and non-flame samples, to determine a class of the region of interest, and/or a support vector machine determining a class of the region of interest.

An approach for detecting a flame may incorporate capturing a scene as images onto a bolometer sensitive to mid-wave infrared radiation, and processing the images to determine whether the images contain a flame. The approach may further incorporate filtering out at least a portion of existing long wave infrared radiation before the radiation reaches the sensor. The filtering may be accomplished with an item selected from a group consisting of a sapphire window, AlON material, and a dual band $CO_2$ and $H_2O$ filter, and other filters.

The processing may incorporate confirming whether the images contain a hazardous flame. Confirming whether the images contain a hazardous flame, may be based on seeking one or more regions of interest in the image that exceed a predetermined threshold temperature, classifying the spatial and/or temporal features from each region of interest to determine a class of a region of interest, and/or analyzing a context of the scene by outlining areas of the scene in the images, and ranking the areas according to an amount of risk in having a hazardous flame. Confirming that the images contain a hazardous flame may result in a hazardous flame alarm.

A flame detection system may incorporate a camera having an uncooled infrared sensor, a lens for focusing an image of a scene onto the sensor, and an infrared filter, for filtering out long wave infrared radiation exceeding a predetermined magnitude, situated between the scene and the sensor. The system may also have a processor connected to the sensor.

The camera may incorporate an explosion-proof housing having an opening for admission of radiation from the scene. The lens, window and/or filter may provide an explosion-proof covering for the opening.

The processor may incorporate a hot region of interest detection module connected to the sensor, a region of area sequence generator connected to the hot region of interest detection module, and a flame dynamic analysis module connected to the generator. The flame dynamic analysis module may incorporate a spatial and temporal feature extraction module connected to the generator, and a selected feature classification module connected to the spatial and temporal feature extraction module. The processor may further incorporate a potential hazard map module, and a hazardous flame confirmation module connected to the potential hazard map module and the flame dynamic analysis module.

The system may further incorporate a distortion removal module connected between the sensor and the hot region of interest detection module, and a scene context analysis module connected to the distortion removal module and the potential hazard map module.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A flame detector comprising:
an infrared sensor having a pixel array with a plurality of pixels;
a lens situated at a first distance from the infrared sensor, where light passes through the lens to the pixel array; and
a long wave infrared filter spaced from the infrared sensor, wherein the long wave infrared filter is situated a second distance from the infrared sensor that is different than the first distance and is configured to filter long wave infrared radiation from substantially all of the light passing through the lens to the plurality of pixels of the pixel array; and
wherein:
infrared radiation from a scene promulgates through the lens and the filter, in either order, to the infrared sensor; and
wherein long wave infrared radiation of the infrared radiation from the scene between the filter and the infrared sensor has a magnitude less than the magnitude of mid wave infrared radiation of the infrared radiation from the scene between the filter and the infrared sensor.

2. The detector of claim 1, further comprising a camera housing holding the infrared sensor, the filter and the lens in place relative to one another.

3. The detector of claim 1, wherein the filter permits primarily infrared radiation having less than an eight micron wavelength to promulgate from the scene to the sensor to restrict the spectral range of detection of the infrared sensor to mid wave infrared radiation.

4. The detector of claim 1, wherein:
the sensor is a bolometer; and
the filter is selected from a group consisting of a sapphire window, AlON material, and a dual band $CO_2$ and $H_2O$ filter.

5. The detector of claim 1, further comprising a processor connected to the sensor for receiving an image from the sensor of the scene.

6. The detector of claim 5, wherein the processor comprises:
a module for seeking one or more regions of interest in the image that exceed a threshold temperature;
a module for extracting spatial and/or temporal features from each region of interest; and
a module for classifying the spatial and/or temporal features to determine a class of a region of interest; and
wherein a class indicates a likelihood of the region of interest being a flame.

7. The detector of claim 6, wherein:
spatial and/or temporal features from each region of interest comprise:
flicker rate of the region, movements of the region, growth rate of the region, and/or other spatial and temporal characteristics of the region; and
the processor further comprises a module for assessing the spatial and/or temporal features against similar features of a reference flame.

8. The detector of claim 6, wherein the processor further comprises:
a module for analyzing a context of the scene by outlining areas of the scene in the image, a module for ranking the areas of the scene in the image according to an amount of risk in having a hazardous flame, and/or a module for confirming a hazardous flame.

9. The detector of claim 6, wherein extracting features is based on:
histograms of x, y and/or temporal gradients of the image, Z-scores of area variation in time of the region of interest, Z-scores of intensity variation in time of the region of interest, and/or a power spectral density estimate of an intensity in time of the region of interest.

10. The detector of claim 6, wherein classifying the features is based on:
one or more features extracted from each region of interest, a statistical classification, trained with flame samples and non-flame samples, to determine a class of the region of interest, and/or a support vector machine determining a class of the region of interest.

11. The detector of claim 1, wherein pixels of the pixel array have an absorber coating applied thereto to facilitate absorption of mid wave infrared radiation.

12. The detector of claim 1, wherein the second distance is configured to allow the filter to filter light passing to each pixel of the pixel array.

13. A method for detecting a flame, comprising:
capturing a scene as images from light passing onto a bolometer sensitive to mid-wave infrared radiation, wherein the bolometer includes a pixel array;
filtering out at least a portion of existing long wave infrared radiation from substantially all light passing to the pixel array before the radiation reaches the bolometer; and
processing the images to determine whether the images contain a flame; and
wherein the filtering is accomplished with an item selected from a group consisting of a sapphire window, AlON material, and a dual band $CO_2$ and $H_2O$ filter.

14. The method of claim 13, wherein the processing comprises:
  confirming whether the images contain a hazardous flame; and
  wherein confirming whether the images contain a hazardous flame, is based on:
    seeking one or more regions of interest in the image that exceed a predetermined threshold temperature, classifying the spatial and/or temporal features from each region of interest to determine a class of a region of interest, and/or analyzing a context of the scene by outlining areas of the scene in the images; and
    ranking the areas according to an amount of risk in having a hazardous flame.

15. The method claim 14, wherein confirming that the images contain a hazardous flame results in a hazardous flame alarm.

16. A flame detection system comprising:
  a camera comprising:
    an uncooled infrared sensor;
    a lens for focusing an image of a scene onto the sensor; and
    an infrared filter, for filtering out long wave infrared radiation exceeding a predetermined magnitude, situated between the scene and the sensor; and
  a processor connected to the sensor, the processor comprising:
    a flame detection module connected to the sensor and configured to detect and identify a plurality of regions of interest each at different locations in an image.

17. The system of claim 16, wherein the camera comprises:
  a housing having an opening for admission of radiation from the scene; and
  wherein the lens, window and/or filter provides a covering of the opening.

18. The system of claim 16, wherein the processor comprises:
  a region of area sequence generator connected to the flame detection module, the region of area sequence generator being configured to group two or more detected regions of interests with detected regions of interest at similar locations in one or more images to form regions of interest sequences; and
  a flame dynamic analysis module connected to the generator, the flame dynamic analysis module being configured to differentiate between regions of interest sequences with a flame and regions of interest sequences without a flame.

19. The system of claim 18, wherein the flame dynamic analysis module comprises:
  a spatial and temporal feature extraction module connected to the generator; and
  a selected feature classification module connected to the spatial and temporal feature extraction module.

20. The system of claim 18, wherein the processor further comprises:
  a potential hazard map module; and
  a hazardous flame confirmation module connected to the potential hazard map module and the flame dynamic analysis module.

21. The system of claim 20, wherein the processor further comprises:
  a distortion removal module connected between the sensor and the hot region of interest detection module; and
  a scene context analysis module connected to the distortion removal module and the potential hazard map module.

* * * * *